Patented Apr. 3, 1923.

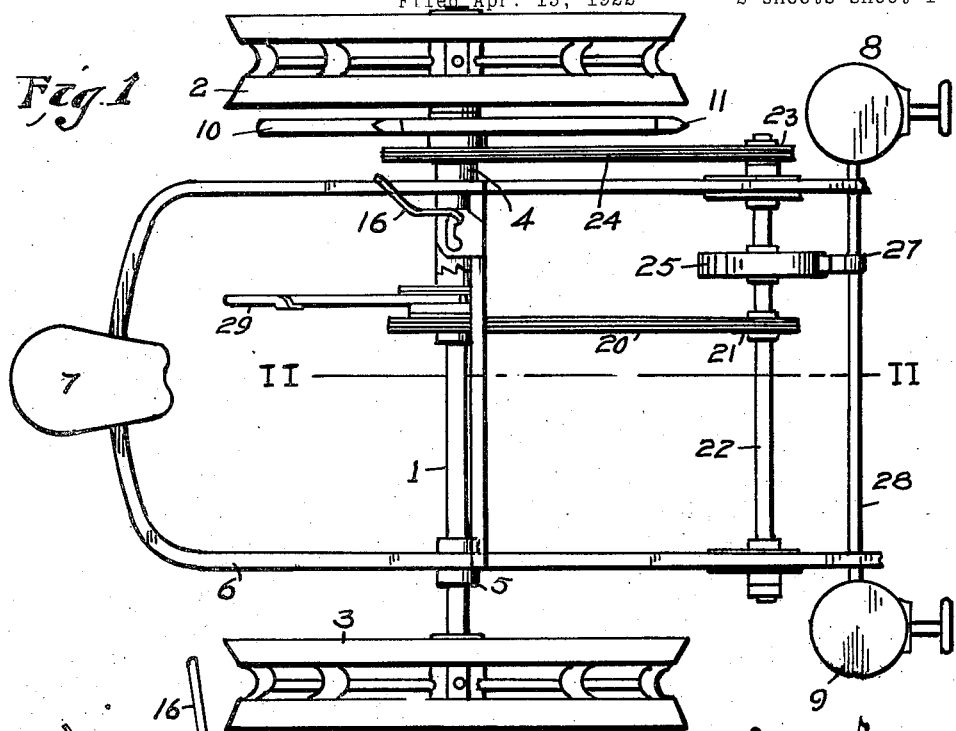
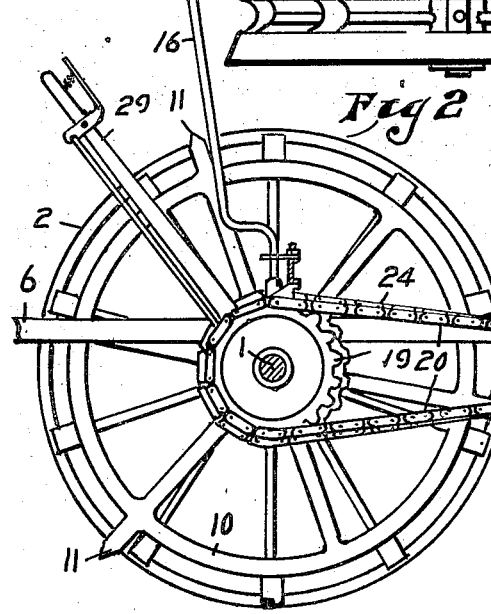
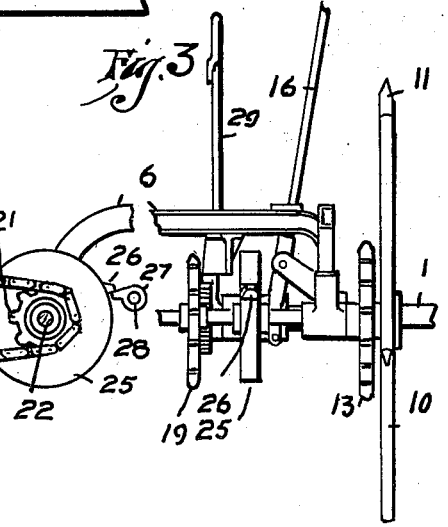

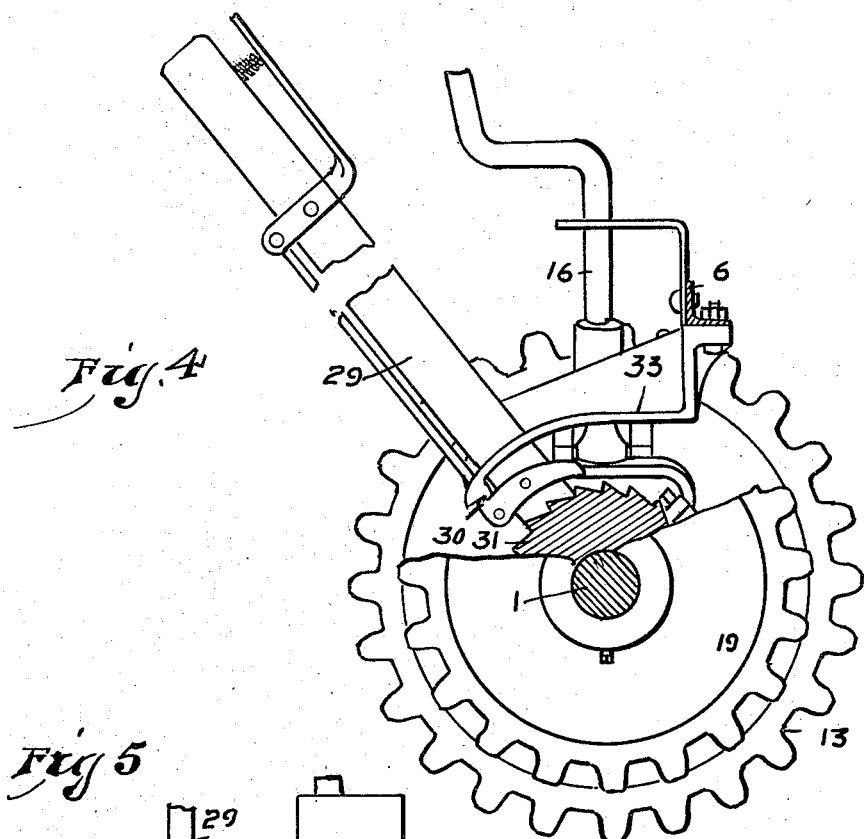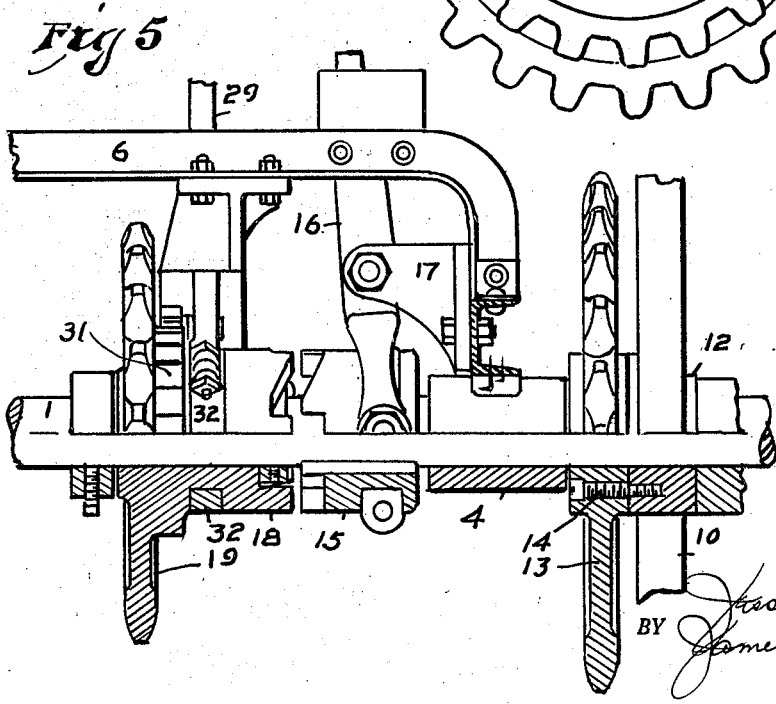

1,450,613

UNITED STATES PATENT OFFICE.

JESSE SCOTT, OF DAYTON, OHIO.

CORN PLANTER.

Application filed April 15, 1922. Serial No. 553,173.

*To all whom it may concern:*

Be it known that I, JESSE SCOTT, a citizen of the United States, and a resident of Dayton, in the county of Montgomery and State of Ohio, have made a new and useful Invention in Corn Planters, of which the following is a specification.

The invention relates to an improvement in corn planters, and particularly to the device for marking the location of the points at which the grain is deposited to act as a guide for the next row, such devices being known as "check rowers." The invention has for its principal objects the provision of an improved construction of this type; which is easily and conveniently operated without any interference with the normal operation of the planter; which is simple and reliable in operation and not liable to get out of order; and which can be readily set, in conjunction with the seed dropping devices, by the operator at the end of the row, or whenever any inequalities of the ground require such setting. One embodiment of the invention is illustrated in the accompanying drawings wherein;

Figure 1 is a plan view of a planter with my improved marking attachment applied thereto; Fig. 2 is a section on the line II—II of Fig. 1; Fig. 3 is a front elevation of one half of the construction of Fig. 1 with the seed boxes removed; Fig. 4 is an enlarged side elevation, partially in section, of the device for setting the marker; and Fig. 5 is a front elevation partially in section of the construction of Fig. 4.

Referring to the drawings, 1 is the axle of a machine to which are keyed or otherwise secured the wheels 2 and 3 so that the axle is rotated by the movement of the machine. Supported upon the axle at the bearings 4 and 5 is the framework 6 which carries the seat 7 and the seed boxes or receptacles 8 and 9.

Located just inside the wheel 1, is the marker wheel 10 which is mounted free to rotate upon the axle and is provided with the three marking prongs 11 (Fig. 2). The hub 12 of the marker wheel is secured to the hub of the sprocket wheel 13 by the screws 14, (Fig. 5), also free to rotate with respect to the axle, and is driven as hereinafter set forth.

Splined upon the axle is a clutch member 15, which is adapted to be moved by means of the handle 16, pivotally supported upon the frame by means of a bracket 17, as shown in Fig. 5. Opposing the clutch member is the clutch sleeve 18 free to rotate upon the axle when disengaged from the member 15. Integral with the sleeve 18 is the sprocket 19, such sprocket serving to drive the chain 20 which extends forwardly and around the sprocket 21 (Figs. 1 and 2) mounted upon a counter-shaft 22. The counter-shaft is mounted in suitable bearings carried by the frame 6. The counter-shaft also carries the sprocket 23 from which the sprocket 13 heretofore referred to is driven by means of the chain 24.

The shaft 22 also carries the tripper wheel 25 (Figs. 1 and 2) provided with a projection 26 for engaging the tripper finger 27 carried by the trip shaft 28 on each revolution of the wheel. The shaft 28 extends into the seed boxes 8 and 9 and operates the valve mechanism therein for controlling the dropping of the grain. The tripper shaft, seed boxes and dropping mechanism are well known in the art and constitute no part of the present invention except to the extent that the dropping mechanism is timed to operate in a certain definite relation to the marking device. This relation is such that the prongs 11 on the marker wheel impress a recess alongside each deposit of corn.

The operation is as follows. When the parts are in the position indicated in Fig. 5 with the clutch member 15 out of engagement with the clutch face of the sleeve 18, the forward movement of the machine does not cause the rotation of the counter-shaft 22 and the marker wheel, or the actuation of the dropper mechanism since the sleeve 18 is loose upon the axle 1. To secure the operation of these parts, the handle 16 is actuated to move the clutch member 15 over into engagement with the sleeve 18, at which time the rotation of the member 15 (splined to the rotating axle) rotates the sleeve 18 and sprocket 19 thus driving the counter-shaft through the chain 20 and sprocket 21 on such shaft. The counter-shaft in turn drives the marker wheel 10 through the intermediary of the sprocket 23, the chain 24 and the sprocket 13 secured to the marker wheel.

Provision is also made for setting the marker wheel and seed dropping mechanism when the clutch member 15 is in the release position of Fig. 5. This is accomplished by means of the hand lever 29 (Fig. 4) provided with the pawl 30 and engaging the ratchet 31 integral with the sleeve 18. The lower end of the lever is swivelled around the sleeve by means of the strap portion 32. The pawl is normally held out of engagement with the ratchet, when the handle is in the position of Fig. 4, by means of the detent 33 carried by the frame. The rotation of the sleeve 18 by the pawl and ratchet device, causes the rotation of the shaft 22, and it in turn, rotates the marker wheel and operates the tripper shaft 28.

The gear timing in the train of connections including the sprocket wheels and chains is such that the shaft 22 and tripper wheel 25 are rotated three times for each rotation of the marker wheel 10, so that the operation of the tripper mechanism and seed dropping mechanism is relatively sharp and quick, insuring the deposit of the seed at a single point instead of scattering it.

What I claim is:

1. In combination in a corn planter, a pair of wheels, an axle therefor secured so as to turn with the wheels, a counter-shaft forward of the axle, a marking device free to rotate on the axle, manually releasable connecting means for driving the counter-shaft from the axle and a driving connection between the counter-shaft and marking device.

2. In combination in a corn planter, a pair of wheels, an axle therefor secured so as to turn with the wheels, a counter shaft forward of the axle, a marking device free to rotate on the axle, a sleeve also free to rotate on the axle, a clutch for connecting the axle to drive the sleeve, a driving connection between the sleeve and counter-shaft, a driving connection between the counter-shaft and the marker, and manually operable means for rotating the sleeve to set the marking device.

In testimony whereof I have hereunto subscribed my name this 10th day of April, 1922.

JESSE SCOTT.

Witnesses:
 PAUL LUCK,
 CORA BROKSCHMIDT.